United States Patent

[11] 3,526,210

| [72] | Inventor | Boye H. Burton |
| | | 321 N.E. Russet St., Portland, Oregon 97211 |
| [21] | Appl. No. | 711,707 |
| [22] | Filed | March 8, 1968 |
| [45] | Patented | Sept. 1, 1970 |

[54] FISH FOOD DISTRIBUTOR FOR HATCHERY RACEWAYS
3 Claims, 4 Drawing Figs.

[52] U.S. Cl. ................................................. 119/51
[51] Int. Cl. ................................................. A01k 5/00
[50] Field of Search ............................................. 119/51, 56, 3, 5, 51.11; 302/28, 29, 27

[56] References Cited
UNITED STATES PATENTS
412,985  10/1889  Schnitzler.................... 302/28

Primary Examiner—Hugh R. Chamblee
Attorney—Oliver D. Olson

ABSTRACT: A fish food dispenser delivers food to an elongated delivery tube located between a pair of separated raceways, and the food is moved through the tube by entrainment in an air stream supplied to the tube by an air fan. At spaced intervals the tube is provided with oppositely directed lateral outlets which communicate with the tube selectively by means of an adjustable valve, whereby to distribute the food selectively to each raceway.

Patented Sept. 1, 1970
3,526,210
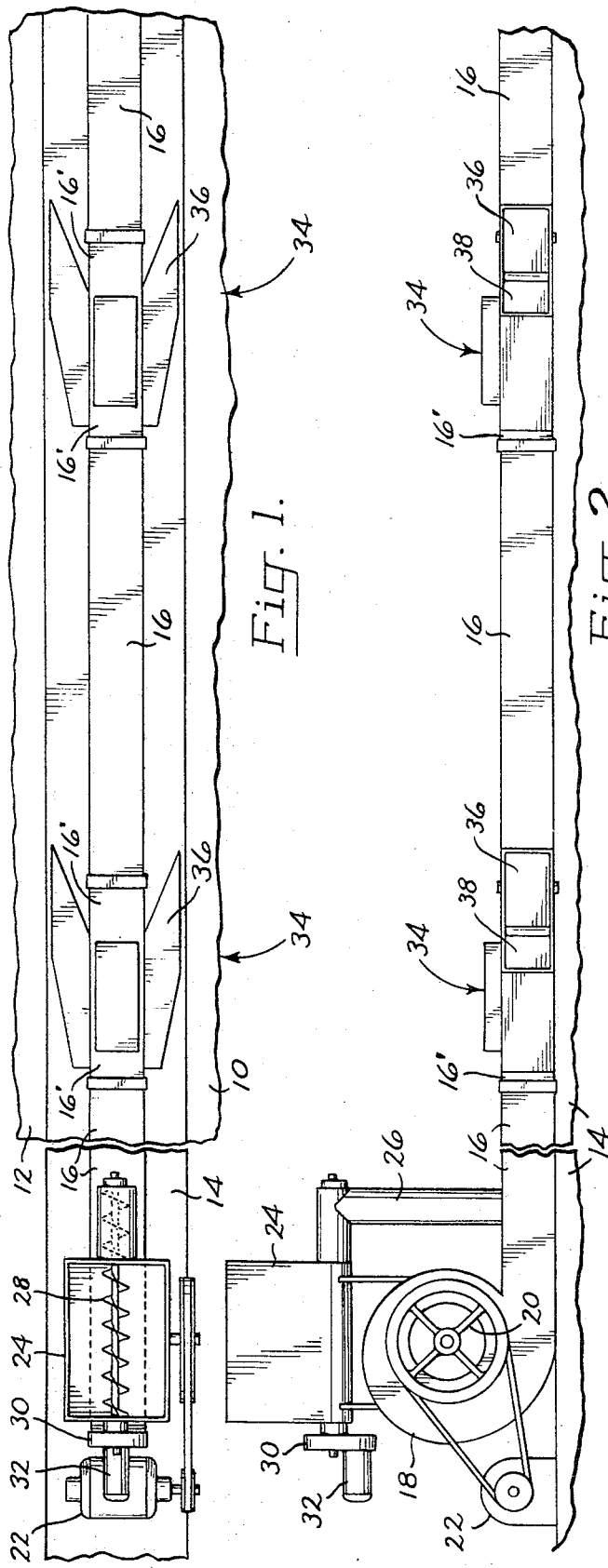
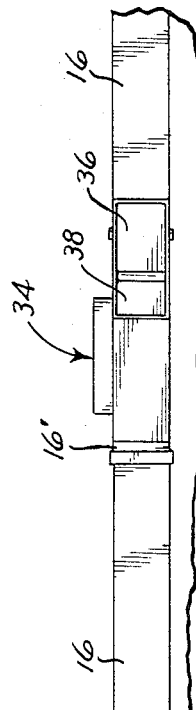
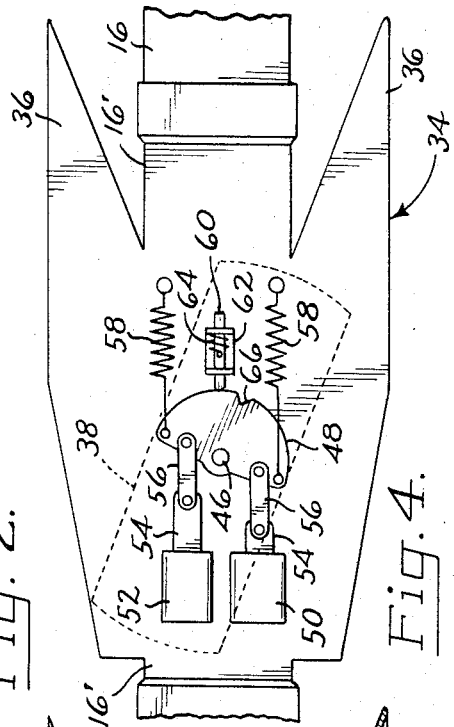
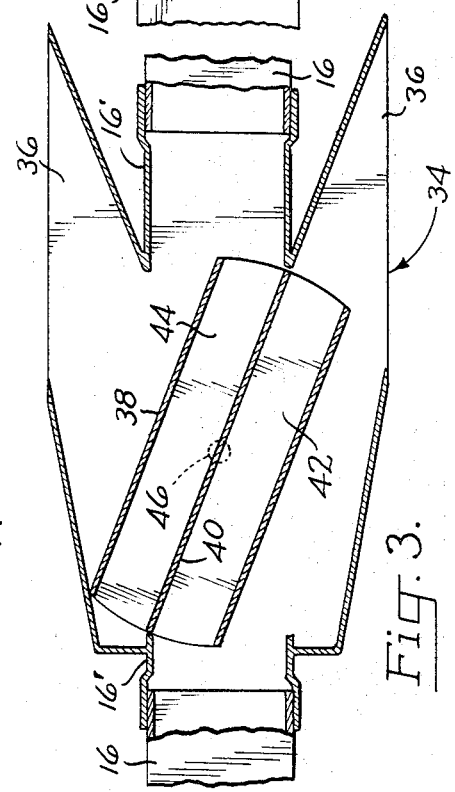
Boye H. Burton
INVENTOR
BY
Olivin D. Olson
Agent

FISH FOOD DISTRIBUTOR FOR HATCHERY RACEWAYS

BACKGROUND OF THE INVENTION

This invention relates to apparatus for distributing fish food in hatchery raceways, and more particularly to a distributor which functions to distribute fish food selectively to each of a pair of adjacent raceways.

It has been the general practice heretofore to distribute fish food to raceways by hand. The primary disadvantage of this slow procedure resides in excessive labor cost. In an effort to minimize this factor, a plurality of food distributors have been located at spaced intervals along the length of a raceway to eject food laterally across the raceway by entrainment in an air stream. By this procedure the food becomes concentrated in spaced areas, with the result that some fish fail to be fed. This inefficient feeding results in slower growth and higher mortality of fish. The procedure further results in excessive costs of hatchery operation due to the requirement of a plurality of distributors for each raceway and to the requirement of more frequent cleaning of the raceway to remove the excess food which not only is wasted but also contributes adversely to upsetting the oxygen balance of the raceway water.

SUMMARY OF THE INVENTION

Broadly, the present invention provides a fish food distributor which functions to distribute food selectively to and uniformly over the areas of a pair of adjacent elongated hatchery raceways.

It is by means of this broad concept that the primary objective of the present invention is achieved, namely to overcome the disadvantages attending the use of prior fish food distributing procedures, as enumerated hereinbefore.

Another important object of the present invention is the provision of a fish food distributor of the class described which is of simplified construction for economical manufacture, which may be installed on existing raceways with speed and facility, and which may be controlled manually, or automatically on a timed sequence, to provide uniform distribution of food for most efficient utilization.

The foregoing and other objects and advantages of this invention will appear from the following detailed description taken in connection with the accompanying drawing of the preferred embodiment.

BRIEF DESCRIPTION OF THE DRAWING

FIG. 1 is a foreshortened, fragmentary plan view of a fish food distributor embodying the features of the present invention, the same being shown in association with a pair of laterally spaced, elongated hatchery raceways.

FIG. 2 is a foreshortened, fragmentary side elevation as viewed from the bottom in FIG. 1.

FIG. 3 is a fragmentary plan view, partly in section, showing details of internal construction of the adjustable control valve component of the distributor.

FIG. 4 is a fragmentary plan view, similar to FIG. 3, showing electrically actuated operator means for the valve component.

DESCRIPTION OF THE PREFERRED EMBODIMENT

In FIG. 1 there is shown for purposes of illustration a pair of elongated raceways 10 and 12 separated by a wall 14. This wall serves conveniently to support the distributor of the present invention.

Accordingly, there is mounted on the upper side of the wall an elongated delivery tube, preferably in the form of releasably connected sections 16 and 16'. The tube extends substantially the full length of the raceways. One end of the tube is connected to an air fan 18, the rotor 20 of which is driven by the electric motor 22 to provide a stream of high velocity air through the tube.

Fish food is delivered to the tube in particulate form, ahead of the air fan, for entrainment in the air stream. In the embodiment illustrated a supply of fish food is contained in the hopper 24 and metered in predetermined amount to the tube through the feed pipe 26, by means of the feed screw 28. The feed screw is driven rotationally by connection through the gear reduction unit 30 to the electric motor 32.

Each delivery tube section 16' is provided with an adjustable discharge device 34 for controlling the ejection of fish food selectively into the pair of raceways. Referring primarily to FIGS. 3 and 4 of the drawing, each discharge device comprises a pair of oppositely directed, laterally extended discharge chutes 36 welded or otherwise secured to the opposite lateral sides of the delivery tube section 16'. The inner open end of each chute registers with an opening in the corresponding lateral side of the tube, and the chute projects angularly forward in the direction of travel of the air stream through the tube. Accordingly, fish food entrained in the air stream is ejected angularly forward into the corresponding raceway, preferably to a distance adjacent the next forward discharge device. In this manner the fish food is distributed substantially uniformly over the entire feeding surface area of the raceway.

Within the delivery tube section 16' between the pair of discharge chutes there is mounted a valve member which is adjustable to control the movement of fish food selectively through the delivery tube or through one or the other of the pair of discharge chutes. In the embodiment illustrated the valve member comprises a hollow tube 38 having substantially the same cross section as the delivery tube and substantially the same length as the longitudinal dimension of the outlet openings in the lateral sides of the delivery tube. A valve plate 40 is positioned midway between the lateral sides of the valve tube and extends longitudinally thereof, to divide the hollow valve tube into a pair of lateral passageways 42 and 44. The valve plate is of sufficient length that when the valve tube is pivoted angularly with respect to the longitudinal axis of the delivery tube, its opposite ends form seals with the adjacent vertical edges of the delivery tube at the diagonally opposite sides of the latter, i.e. at the upstream and downstream ends thereof.

The valve tube is mounted for the aforementioned pivotal movement by means of the pivot pin 46. This pin extends upwardly through the top wall of the delivery tube. The projecting end of the pin supports a lever 48 which is secured thereto intermediate its ends.

A pair of electrical solenoids 50 and 52 are mounted on the upper wall of the delivery tube and the armatures 54 thereof are connected pivotally through the link members 56 to the lever 48, on opposite sides of the pivot pin 46. A pair of coil springs 58 are secured at one of their ends to the top wall of the delivery tube and at the opposite ends to the lever, on opposite sides of the pivot pin and in opposition to the movement of the solenoid armatures. A pawl 60 is mounted movably in a bracket 62 secured to the top wall of the delivery tube and is urged by the spring 64 resiliently toward a detent 66 in the lever. The detent is so arranged that when it is engaged by the pawl the valve tube 38 is aligned axially with the delivery tube 16.

The operation of the fish food distributor described hereinbefore is as follows:

Let it be assumed that it is desired first to distribute fish food to the raceway 10 located to the right of the delivery tube, when facing the direction of travel of the air stream through the latter from the fan. Let it be assumed further that all solenoids are deenergized and therefore all valve tubes 38 are aligned axially with the delivery tube sections 16', whereby all lateral openings in the delivery tube are closed by the valve tubes. The operator first closes an electric switch to complete the electric circuit of the right hand solenoid associated with the discharge device 34 closest to one end of the raceway. Upon retraction of the armature of the energized solenoid, the lever 48 is pivoted clockwise against the tension of the associated return spring 58, whereupon the associated valve tube 38 is pivoted clockwise to the position illustrated in FIG. 3. In this position the valve plate 40 seals the left hand discharge chute 36 and the downstream end of the delivery tube section 16' from the upstream end of the latter. In this position the upstream end of the delivery tube communicates with the right hand discharge chute. The air fan and feeder motors then are energized, whereupon fish food is delivered into the high velocity air stream and ejected through the selected right hand discharge chute into the selected end of the right hand raceway 10.

When the desired quantity of fish food has been delivered through the selected right hand discharge chute, the operator opens the electric circuit of the associated solenoid to return the associated valve tube to its position of axial alignment with the delivery tube, and then closes a switch in the electric circuit of the right hand solenoid assoicated with the next succeeding discharge device. This procedure is repeated successively for all of the longitudinally spaced discharge devices, whereupon the distribution of fish food to the right hand raceway 10 is completed.

The foregoing procedure then is repeated for distribution of fish food to the left hand raceway 12, it being understood that this involves the successive activation of the left hand solenoids 52 to pivot the associated valve tubes 38 counterclockwise to communicate the upstream end of the delivery tube sections 16' with the left hand discharge chutes 36 and to seal the right hand delivery chutes and the down stream end of the delivery tube from the upstream end.

It will be apparent that the sequential activation and deactivation of the solenoids may be controlled automatically by conventional timer switches, many types of which are well known in the art. If desired, the electrical solenoids may be replaced by air cylinders, etc., or may be omitted and the valve tubes operated manually, as by a lever connected to each pin 46.

It will be further apparent that a pair of feeder devices may be employed to deliver two different types of fish food to the delivery tube, one type of food being for delivery to one of the raceways and the other type of food being for delivery to the other raceway.

The foregoing and various other changes in the size, shape, number, type and arrangement of parts described hereinbefore may be made without departing from the spirit of this invention.

I claim:

1. A fish food distributor for a pair of spaced, elongated fish hatchery raceways, comprising:

A. an elongated delivery tube adapted to be positioned between the raceways;
   B. means at one end of the tube for delivering to the latter fish food entrained in an air stream; and
   C. a plurality of discharge means spaced longitudinally along the tube and each comprising:
      1. a pair of oppositely directed lateral discharge outlets communicating with the tube; and
      2. valve means in the tube movable selectively to a first position for sealing both outlets from the tube and for communicating with each other the portions of delivery tube upstream and downstream with respect to the valve means, to a second position for sealing one outlet and downstream portion of the tube from the upstream portion and for communicating the other outlet with the upstream portion, and to a third position for sealing the other outlet and downstream portion of the tube from the upstream portion and for communicating said one outlet with the upstream portion, the valve means comprising:
         a. a valve tube of substantially the same cross section as the adjacent portion of the delivery tube and of substantially the same length as the outlets;
         b. pivot means mounting the valve tube adjacent the pair of outlets and between the upstream and downstream portions of the delivery tube for pivotal movement of its longitudinal ends laterally toward and away from the outlets; and
         c. a longitudinal valve plate in the valve tube dividing the latter into a pair of lateral passageways, the valve plate serving as a seal for the second and third positions of adjustment of the valve means.

2. The distributor of claim 1 including valve operator means comprising:
   a. lever means secured intermediate its ends to the pivot means;
   b. a pair of electric solenoids engaging the lever means one on each side of the pivot means; and
   c. spring means engaging the lever means and urging the valve tube to said first position of adjustment.

3. The distributor of claim 1 wherein the valve tube and adjacent portion of the delivery tube are rectangular in cross section, and the pair of outlets include rectangular openings in the opposite lateral sides of the delivery tube and outlet chutes extending laterally from said openings angularly forward in the upstream direction of the delivery tube.